March 22, 1932.   G. A. MITCHELL   1,850,411
FILM MOVEMENT
Filed April 25, 1930   3 Sheets-Sheet 1
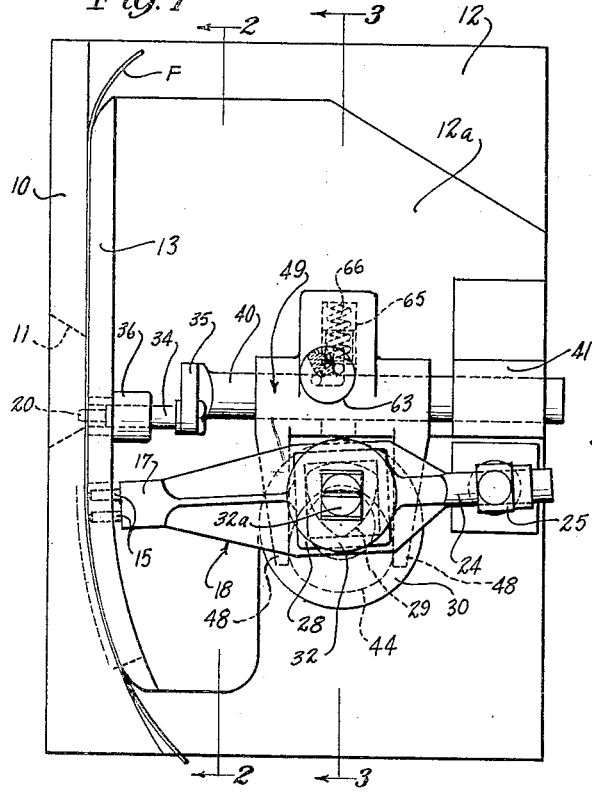
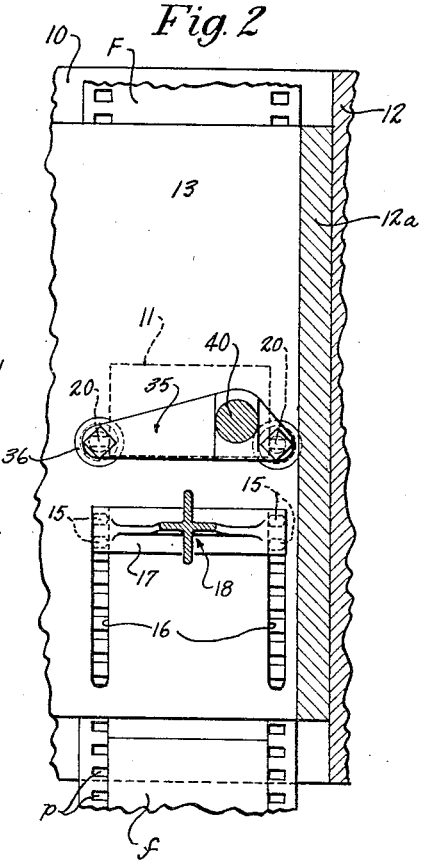
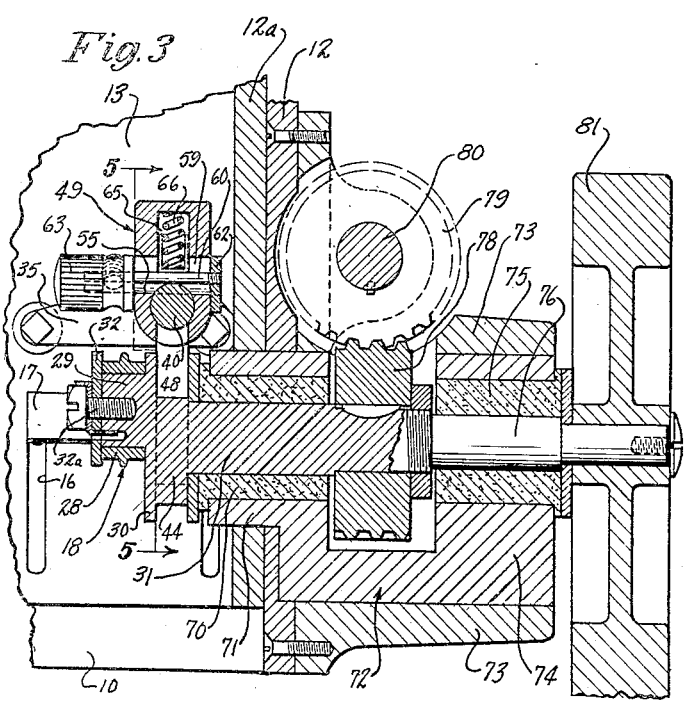
Inventor
George A. Mitchell.
Attorney.

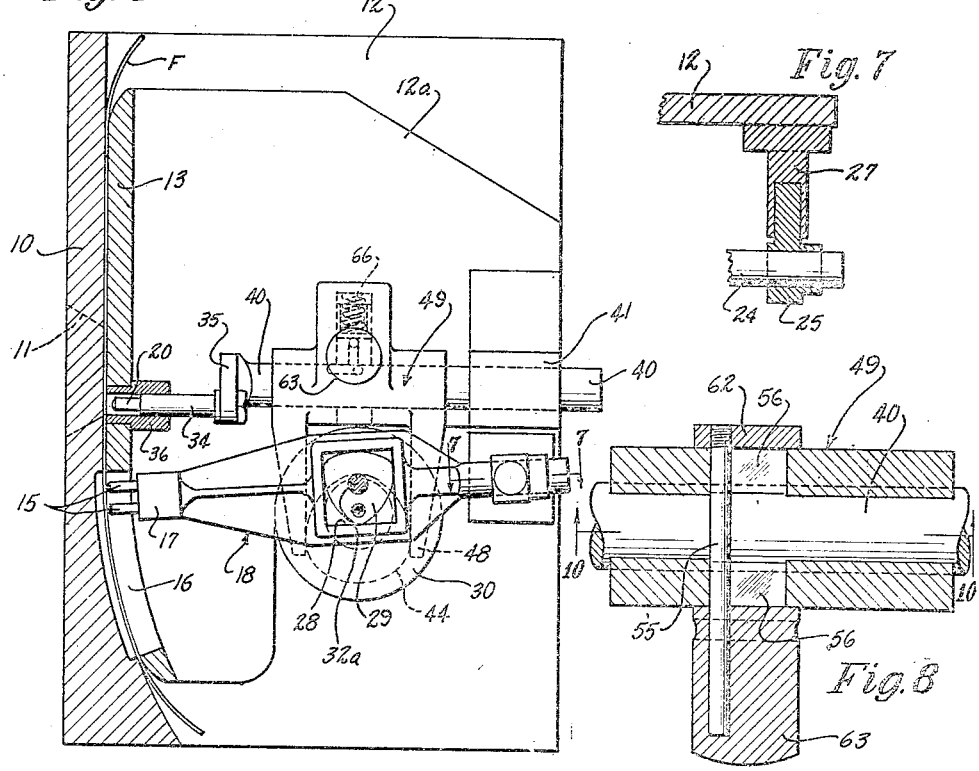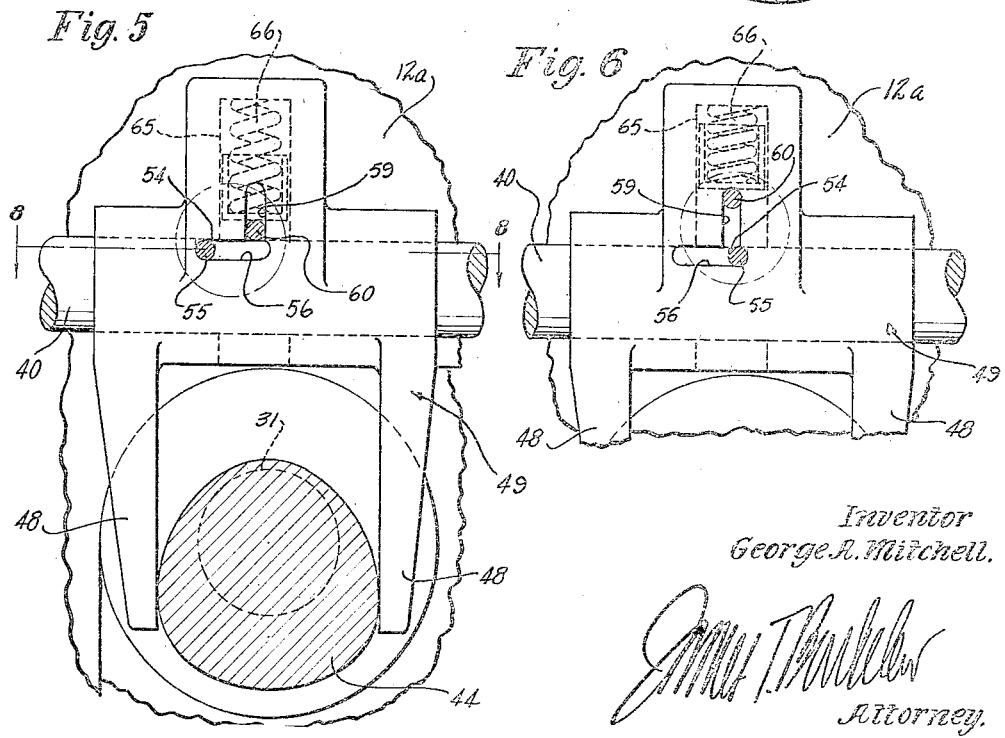

March 22, 1932.  G. A. MITCHELL  1,850,411
FILM MOVEMENT
Filed April 25, 1930    3 Sheets-Sheet 3
Fig.10
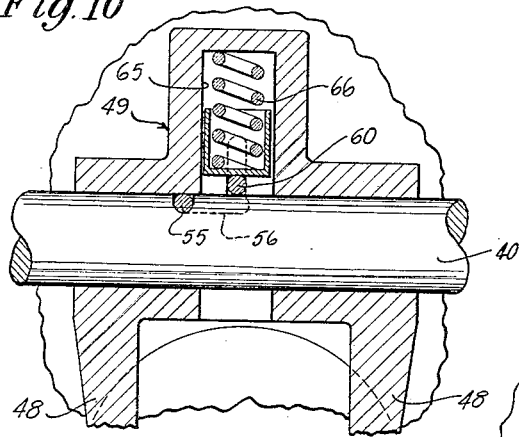
Fig.11
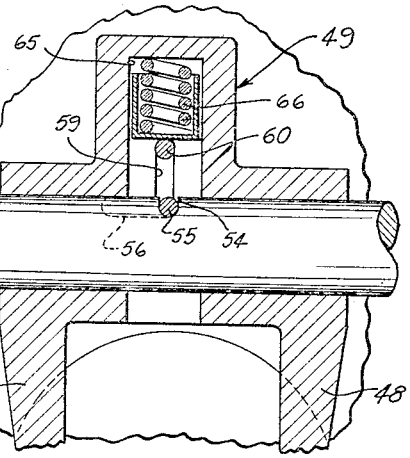
Fig.12
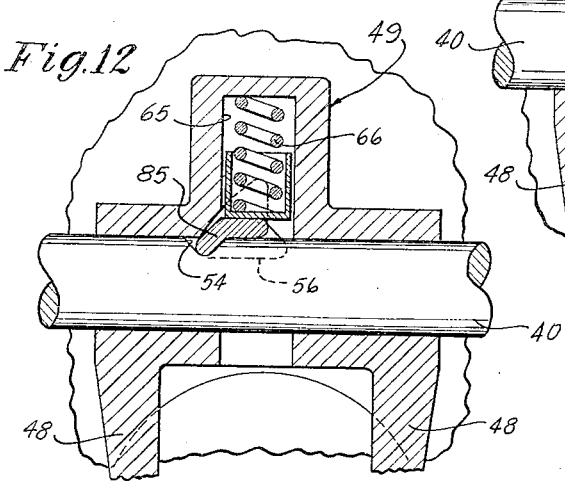
Fig.13
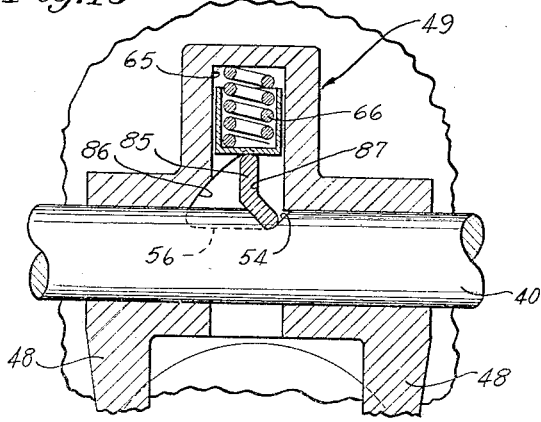
Inventor
George A. Mitchell.
Attorney Patented Mar. 22, 1932

1,850,411

UNITED STATES PATENT OFFICE

GEORGE A. MITCHELL, OF LOS ANGELES, CALIFORNIA, ASSIGNOR TO MITCHELL CAMERA CORPORATION, OF WEST HOLLYWOOD, CALIFORNIA, A CORPORATION OF DELAWARE

FILM MOVEMENT

Application filed April 25, 1930. Serial No. 447,297.

This invention relates generally to intermittent movement mechanisms, and more particularly to film movements for motion picture cameras and the like.

It is one of the foremost objects in the designing of an intermittent film movement for a high grade motion picture camera to avoid noise making parts, which are particularly objectionable when the movement is installed in a camera to be utilized in the taking of sound pictures. A number of well known and otherwise highly efficient movements are, in fact, comparatively noisy and therefore objectionable for sound picture purposes.

It is therefore an object of the present invention to provide a high grade film movement of great simplicity and characterized by increased quietness of operation.

The film movement of the present invention is of the general type disclosed in my U. S. Patent No. 1,648,559; embodying, as does the movement therein disclosed, an oscillative claw arm mounted to move pivotally and longitudinally, a cam operating on the arm to give the alternating longitudinal and pivotal movements to the claw arm, and also embodying film holding mechanism operable on the film alternately with the claw arm and including a reciprocable member having film engageable pilot pins and operated by a cam which is driven together or in synchronism with the said claw-arm-operating cam. In my original movement the two cams referred to were mounted on a pair of meshing spur gears, the gears being mounted on a pair of shafts one of which was geared to the camera driving mechanism. These two shafts were journaled in a plate which was mounted in the camera to swing about the axis of the driven shaft, in such a manner that the plate could be swung to move the claw arm out of engagement with the film at a time when the pilot pins were out of engagement with the film (normally the film is always engaged either by the claw arm or the pilot pins), when it is desired to thread the film through the movement. In this arrangement one of the gear shafts is very short, and a disadvantage of this movement resided in the short bearing arrangement which resulted.

According to my present invention a design is provided in which the two cams are mounted on a single drive shaft, thus eliminating the pair of spur gears, which contributed in a large measure to the noise of the prior movement. With this arrangement is provided an improved bearing design for the drive shaft, which steadies the movement and decreases noise from vibration.

There is further provided an extremely simple arrangement for withdrawing the pilot pins from the film when the claw arm is out of engagement therewith.

These features, however, may best be set forth in the course of the following detailed description of a present preferred embodiment of the invention, reference for this purpose being had to the accompanying drawings, in which:

Fig. 1 is a side elevation of the movement, the claw pins being shown just before entering the film, while the pilot pins are in engagement with the film;

Fig. 2 is a vertical transverse section taken on line 2—2 of Fig. 1;

Fig. 3 is a vertical transverse section taken on line 3—3 of Fig. 1;

Fig. 4 is a side elevation of the movement similar to Fig. 1, but showing the pilot pins withdrawn from the film for the purpose of threading the movement;

Fig. 5 is an enlarged fragmentary view taken from Fig. 1;

Fig. 6 is a view similar to Fig. 5 but showing the parts in the position of Fig. 4;

Fig. 7 is a detail section taken on line 7—7 of Fig. 4;

Fig. 8 is a section taken on line 8—8 of Fig. 5;

Fig. 9 is a diagram showing the path of the claw pins;

Fig. 10 is a section taken as indicated by the line 10—10 of Fig. 8, showing the parts in the position of Fig. 5;

Fig. 11 is a view similar to Fig. 10, but showing the parts in the position of Fig. 6;

Fig. 12 is a view similar to that of Fig. 10 but showing a variational embodiment of the parts; and

Fig. 13 is a view of the embodiment of Fig. 12 shown in a position corresponding to that of Fig. 11.

The mechanism of the invention is adapted to be arranged in a case of any suitable design and construction and may be arranged to operate with suitable shutter mechanism and with a suitable arrangement of lenses. For the sake of simplicity, however, the invention is herewith set forth independent of any particular case, shutter mechanism, arrangement of lenses, etc., it being apparent how the mechanism can be incorporated in a suitable design with such units.

Referring now to the drawings, the numeral 10 designates a vertical aperture plate having an exposure aperture 11, and the numeral 12 designates a vertical wall arranged at right angles to and extending rearwardly from an edge of plate 10. Spaced rearwardly from aperture plate 10 and extending at right angles from a plate 12a fastened face to face against wall 12 is a guide plate 13, between which and the aperture plate is provided the guide way for the film F. The film is moved intermittently in the guide way by the film moving mechanism, later to be described, while during the periods of "dwell," or alternately with the periods of movement or "pull down," the film is engaged by film holding mechanism, which registers the successive film frames $f$ with the exposure aperture 11. The film guide way is vertically disposed except at the lower portion thereof where it is curved rearwardly to conform to the curvature of motion of the film moving means, now to be described.

The film is advanced by means of film moving pins 15 extending through vertical slots 16 in plate 13 from the ends of a cross arm 17 arranged at the forward end of a swinging claw arm 18, which is operated to cause its film moving pins to intermittently engage the film perforations $p$ and draw the film downwardly (or upwardly) through successive frame lengths. The film moving pins are of proper size and are so spaced as to fit nicely in the film perforations.

Pilot pins 20, which are also of proper size and shape to fit nicely in the film perforations, are intermittently operated, as later to be detailed, to engage the film alternately with the film moving pins in such a manner that the pilot pins engage the film perforations $p$ just before the film moving pins are withdrawn therefrom, and are withdrawn from the film just after the film moving pins again engage the film perforations, so that the film is always engaged by one or the other of the pairs of pins.

The film moving claw arm 18 has at its rear end a slide rod 24 taken by a pivoted slide-bearing block 25 that is carried on the end of a stud rotatably supported in a stationary bearing 27. There is thus provided a pivoted slide-bearing support for the rear end of the claw arm. Intermediate the ends of the claw arm 18 there is formed a box 28, within which works a cam 29. Cam 29 is formed on the outer face of a flange 30 integral with the drive shaft 31 of the movement (see Fig. 3). A washer 32 held against the outer face of cam 31 by means of a screw 32a threaded thereinto confines the box of arm 18 in proper lateral position on cam 29.

Rotation of shaft 31 and cam 29 causes the claw arm 18 to oscillate about the pivotal axis of the slide bearing 25, and to move longitudinally in the bearing. The cam and box are in the present instance so formed as to cause the film moving pins on the forward end of the claw arm to describe a path such as is illustrated at $m$ in Fig. 9.

The film registering or pilot pins 20 extend forwardly from studs 34 carried at the opposite ends of a cross-arm 35, studs 34 having sliding bearing within bushings 36 extending through the guide plate 13. Cross-arm 35 is carried on the forward end of a rod 40, the rear end of which is taken in a slide bearing 41. There is then provided an operative connection between rod 40 and the claw arm operating means, so that the pilot pins are operated to engage the film just before the film moving pins are removed therefrom, and to withdraw from the film just after the film moving pins again engage the film.

This connection is embodied as follows: The drive shaft 31 of the movement has just to the rear of cam 29 and flange 30, a second cam 44 this cam working between the horizontally spaced depending projections 48 of a cam follower, generally designated at 49. Follower 49, which will be seen to be given horizontal motion from cam 44, has in its body a horizontal drill hole to slidably take the pilot pin operating rod 40. Means hereinafter to be described are then provided for releasably clamping the cam follower on the rod 40 so that the cam 44 will act to operate the pilot pins, the two cams 29 and 44 of drive shaft 31 being so relatively disposed that the pilot pins are operated to engage the film just before the film moving pins are removed from the film by operation of the claw arm, and to withdraw from the film just after the film moving pins again engage the film.

The connecting means between the cam follower and the slide rod 40 are embodied as follows: The upper side of the slide rod 40 has, at a point located within the follower body, a transverse notch 54 that takes a connecting pin 55, this pin extending out through the sides of the follower body through horizontal slots or ways 56 provided therein. It will be seen from an inspection of the drawings that the pin 55 is held in the notch 54 of the slide rod, but that the pin can move relative to the follower body within the end limits of the horizontal slot 56, and accordingly that the rod 40 is taken by the pin through this amount of longitudinal movement in and relative to the follower body.

Vertical slots or ways 59 are then provided in the follower body in communication with the horizontal ways 56 near the right hand end thereof, as viewed in Figs. 5 and 6, and a pin 60 extends through these vertical slots in a direction parallel to the first pin 55. The rear ends of these pins screw thread into a plate 62, while the forward ends of the pins are taken and secured within a thumb-piece 63. Provided in a cavity 65 in the body of the follower above the pin 60 is a compression spring 66 that acts constantly downwardly on pin 60.

It may now be seen that rotation of thumb-piece 63 to the left when the parts are in the position of Figs. 1 and 5 and the pilot pins are in engagement with the film, will cause the vertically movable pin 60 to rise in the vertical slots 59 against spring 66, and the horizontally movable pin 55 to move to the right in the horizontal slots 56, until the parts are stopped by reason of pin 55 reaching the right hand end of the slot 56; and in so doing, the pin 55 carries the slide rod 40 rearwardly through the follower body to remove the pilot pins from the film. After such movement the parts are in the position of Figs. 4 and 6, and it will be noted, first, that both the film moving pins and the pilot pins are withdrawn from the film, and second, that the horizontally movable connecting pin 55 is slightly past center or to the right of the vertical course 59 and the spring 66 is therefore acting to force the horizontal pin in a direction toward the right rather than to return it back toward the left. The parts will therefore stand in that position until the thumb-piece 63 is rotated back toward the right, which causes the spring 66 to be slightly compressed while pin 55 moves under the vertical way 59, after which the spring acts through pin 60 to return the parts to the original position of Figs. 3 and 5, in which the slide rod 40 is again in film engageable position. The spring 66 is, of course, made sufficiently strong that there is no relative movement between the slide rod 40 and the cam follower during the normal operation of the movement.

Figs. 12 and 13 are views similar to Figs. 10 and 11 but showing a variational embodiment of the element that connects the follower 49 with the rod 40. In this case the pins 55 and 60 are replaced by a plate 85, one side edge of which is pivotally taken in the notch 54 of rod 40, and the other side edge of which is guided vertically in the follower body. The follower body is cut out, as at 86, to accommodate the plate. The lower edge of the plate works in the horizontal course 56 of the follower body, as does the pin 55 in the other form, while the upper edge of the plate is guided by the cam surface 87 of the follower body, which surface corresponds to the right hand side of the vertical groove 59 in the other form. It will be apparent that in either form there is, broadly speaking, a connective element having one side pivotally connected with the motion transmitting element or rod 40, and having the other side in engagement with and guided by a cam surface or groove in the other motion transmitting element or follower 49.

The drive shaft 31 of the movement is journalled just rearwardly of cam 44 in a bearing 70 fitted within a cylindric bearing support 71 extending through an opening in the walls 12 and 12a of the movement. This bearing support 71 forms one arm of a yoke-like member 72 that is fitted within a cylindric housing 73 secured to the rear face of wall 12, the other arm 74 of yoke 72 carrying an outer bearing 75 for a reduced outer section 76 of drive shaft 31. Between the yoke arms 71 and 74 there is keyed on shaft 31 a spiral gear 78, and a driving spiral gear 79 mounted on a transverse shaft 80 extends through an opening in the top side of housing 73 to mesh with gear 78. The outer end of drive shaft 31 carries a usual fly wheel 81.

There is thus provided an extremely simple movement in which but a single drive shaft is employed for the operation both of the film moving and the film holding means, which has a convenient and quickly manipulated means for withdrawing the pilot pins to thread the film, and further which has a simple but extremely stable and rugged bearing arrangement that acts greatly to reduce noise from vibration.

It will be understood the drawings and description are to be considered merely as illustrative of and not restrictive on the broader claims appended hereto, for various changes in design, structure and arrangement may be made without departing from the spirit and scope of said claims.

I claim:—

1. In a film movement, the combination of a frame providing a film guide way, a claw arm operable to engage and move a film in the guide way, a rotating shaft, a cam on said shaft acting on the claw arm to cause it intermittently to engage and move the film, means for engaging and holding the film stationary, said means including a second cam on the rotating shaft, a follower for said cam, a reciprocable film engaging member, and an interconnection between said cam follower and said reciprocable member, said interconnection including means normally setting said reciprocable member relative to said follower, but operable manually to move said member relative to said follower.

2. In a film movement, the combination of a frame providing a film guide way, a claw arm operable to engage and move a film in the guide way, a rotating shaft, a cam on said shaft acting on the claw arm to cause it intermittently to engage and move the film, means for engaging and holding the film stationary, said means including a second cam on the rotating shaft, a follower for said cam, a reciprocable film engaging member, and an interconnection between said cam follower and said reciprocable member, said interconnection including means operable selectively to set said reciprocable member in either of two positions relative to said follower.

3. In a film movement having film moving mechanism and film holding means including a film engageable member, a motion transmitting member connected with the film engageable member, a second motion transmitting member mounted on and slidable with relation to the first mentioned member, and means for sliding one member with relation to the other and for locking the two members in a set relative position, said means including a shiftable connective element having one side pivotally connected with one of said members, and a cam groove in the other member acting to guide the other side of said element.

4. In a film movement having film moving mechanism and film holding means including a film engageable member, a motion transmitting member connected with the film engageable member, a second motion transmitting member mounted on and slidable with relation to the first mentioned member, and means for sliding one member with relation to the other and for locking the two members in a set relative position, said means including a shiftable connective element having one side pivotally connected with one of said members, and a cam groove in the other member acting to guide the other side of said element with relation to said groove carrying member in a direction substantially at right angles to the direction of relative sliding movement between the two members.

5. In a film movement having film moving mechanism and film holding means including a film engageable member, a motion transmitting member connected with the film engageable member, a second motion transmitting member mounted on and slidable with relation to the first mentioned member, and means for sliding one member with relation to the other and for locking the two members in a set relative position, said means including a shiftable connective element spring actuated to set position, said element having one side pivotally connected with one of said members, and a cam groove in the other member acting to guide the other side of said element.

6. In a film movement having film moving mechanism and film holding means including a film engageable member, a motion transmitting member connected with the film engageable member, a second motion transmitting member mounted on and slidable with relation to the first mentioned member, and means for sliding one member with relation to the other and for locking the two members in a set relative position, said means including a shiftable connective element spring actuated to set position, said element having one side pivotally connected with one of said members, and a cam groove in the other member acting to guide the other side of said element.

7. In a film movement, the combination of a film engaging and moving claw arm, operating means causing said claw arm intermittently to engage and move a film, and film holding means engageable with the film alternately with the claw arm, said film holding means including a cam driven by said operating means, a follower for said cam, a reciprocable film engaging member, and an operative interconnection between said follower and said reciprocable member, said interconnection including holding means normally setting said reciprocable member relative to said follower but operable manually to shift said member relative to said follower.

8. In a film movement, the combination of a film engaging and moving claw arm, operating means causing said claw arm intermittently to engage and move a film, and film holding means engageable with the film alternately with the claw arm, said film holding means including a cam driven by said operating means, a follower for said cam, a reciprocable film engaging member, and an operative interconnection between said follower and said reciprocable member, said interconnection including holding means normally setting said reciprocable member relative to said follower, and a manual member operable in conjunction with said holding means to shift said reciprocable member relative to said follower.

9. In a film movement, the combination of a film engaging and moving claw arm, operating means causing said claw arm intermittently to engage and move a film, and film holding means engageable with the film alternately with the claw arm, said film holding means including a cam driven by said operating means, a follower for said cam, a reciprocable film engaging member slidable on said follower, and manual means for moving and setting said reciprocable member with respect to said follower.

10. In a film movement, the combination of a film engaging and moving claw arm, operating means causing said claw arm intermittently to engage and move a film, and film holding means engageable with the film alternately with the claw arm, said film holding means including a cam driven by said operating means, a follower for said cam, a reciprocable film engaging member, and an operative interconnection between said follower and said reciprocable member, said interconnection including means yieldingly holding said reciprocable member in either of two positions relative to said follower, and manual means for shifting said reciprocable member between said positions.

11. In a film movement, the combination of a film engaging and moving claw arm, operating means causing said claw arm intermittently to engage and move a film, and film holding means engageable with the film alternately with the claw arm, said film holding means including a cam driven by said operating means, a follower for said cam, a reciprocable film engaging member, and an operative interconnection between said follower and said reciprocable member, said interconnection including spring-actuated means yieldingly holding said reciprocable member in either of two positions relative to said follower, and manual means for shifting said reciprocable member between said positions.

In witness that I claim the foregoing I have hereunto subscribed my name this 19th day of March, 1930.

GEORGE A. MITCHELL.